(12) United States Patent
Lee

(10) Patent No.: US 11,326,906 B2
(45) Date of Patent: May 10, 2022

(54) APPARATUS FOR SENSING ROTATING BODY

(71) Applicant: Samsung Electro-Mechanics Co., Ltd., Suwon-si (KR)

(72) Inventor: Dong Yeol Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 49 days.

(21) Appl. No.: 16/420,271

(22) Filed: May 23, 2019

(65) Prior Publication Data

US 2020/0166379 A1 May 28, 2020

(30) Foreign Application Priority Data

Nov. 23, 2018 (KR) .......................... 10-2018-0146365
Dec. 27, 2018 (KR) .......................... 10-2018-0170515

(51) Int. Cl.
  *G01D 5/22* (2006.01)
(52) U.S. Cl.
  CPC ................................ *G01D 5/2291* (2013.01)
(58) Field of Classification Search
  CPC .................................................. G01D 5/2291
  See application file for complete search history.

(56) References Cited

U.S. PATENT DOCUMENTS

| 5,880,586 | A | * | 3/1999 | Dukart | G01D 5/145 |
| | | | | | 324/207.2 |
| 9,523,589 | B2 | * | 12/2016 | Nakamura | G01D 5/142 |
| 2002/0005316 | A1 | * | 1/2002 | Tokumoto | B62D 5/0472 |
| | | | | | 180/446 |
| 2004/0085079 | A1 | | 5/2004 | Lin et al. | |
| 2016/0123769 | A1 | | 5/2016 | Nishimoto et al. | |
| 2017/0003182 | A1 | * | 1/2017 | Schweizer | G01L 3/104 |
| 2017/0089734 | A1 | * | 3/2017 | Tolsa | G01D 5/24 |
| 2019/0094048 | A1 | * | 3/2019 | Lee | G01D 5/243 |

FOREIGN PATENT DOCUMENTS

| JP | 2002-90109 A | 3/2002 |
| JP | 2006-258561 A | 9/2006 |
| JP | 2009-128312 A | 6/2009 |
| JP | 6217596 B2 | 10/2017 |

OTHER PUBLICATIONS

Korean Office Action dated Dec. 19, 2019 in counterpart Korean Patent Application No. 10-2018-0170515 (7 pages in English and 5 pages in Korean).

* cited by examiner

*Primary Examiner* — Reena Aurora
(74) *Attorney, Agent, or Firm* — NSIP Law

(57) ABSTRACT

An apparatus for sensing a rotating body includes a detection target arranged on a surface perpendicular to an extension direction of a rotating shaft of the rotating body, a sensor module facing the detection target, and comprising two sensors disposed in a rotation direction of the rotating body, and a rotation information calculator configured to calculate rotation information of the rotating body based on sensed values from the two sensors, wherein the rotation information calculator is further configured to calculate a rotation angle of the rotating body in accordance with a difference value generated from the sensed values.

17 Claims, 5 Drawing Sheets

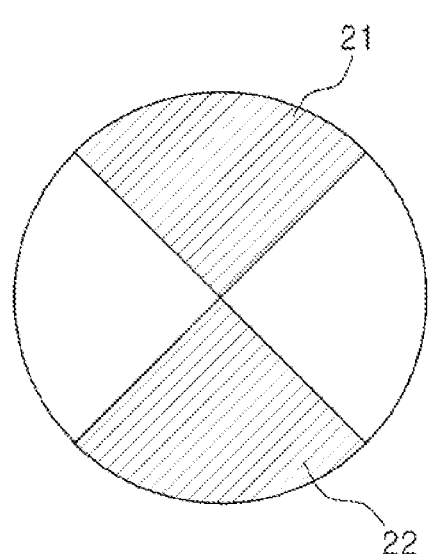 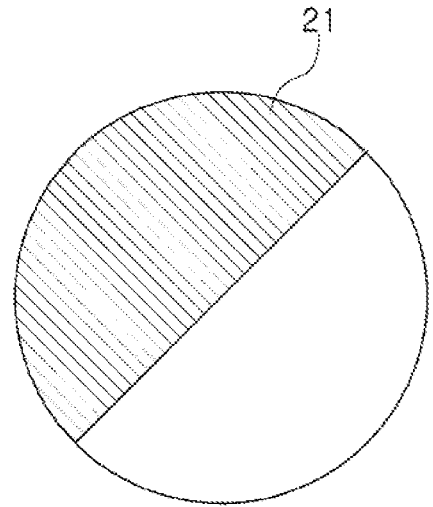
FIG. 3A  FIG. 3B
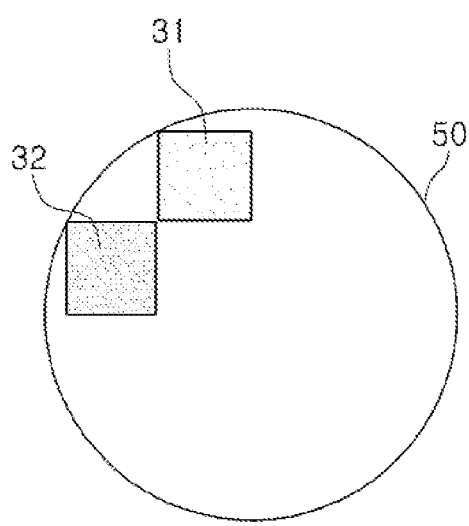 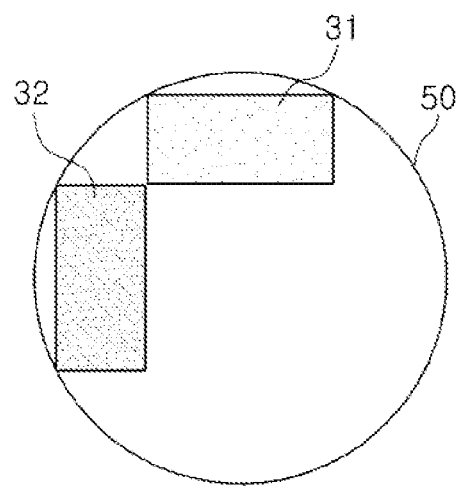
FIG. 4A  FIG. 4B

APPARATUS FOR SENSING ROTATING BODY

CROSS-REFERENCE TO RELATED APPLICATION(S)

This application claims the benefit under 35 U.S.C. § 119(a) of Korean Patent Application No. 10-2018-0146365 filed on Nov. 23, 2018 and Korean Patent Application No. 10-2018-0170515 filed on Dec. 27, 2018 in the Korean Intellectual Property Office, the entire disclosures of which are incorporated herein by reference for all purposes.

BACKGROUND

1. Title

The present disclosure relates to an apparatus for sensing a rotating body.

2. Description of Related Art

A rotating body has been used in various devices such as, for example, a motor and a wheel switch of a wearable device. In accordance with a trend to make such devices smaller and thinner, a sensing circuit for sensing a position of a rotating body senses a fine displacement of a rotating body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect there is disclosed an apparatus for sensing a rotating body, including a detection target arranged on a surface perpendicular to an extension direction of a rotating shaft of the rotating body, a sensor module facing the detection target, and comprising two sensors disposed in a rotation direction of the rotating body, and a rotation information calculator configured to calculate rotation information of the rotating body based on sensed values from the two sensors, wherein the rotation information calculator is further configured to calculate a rotation angle of the rotating body in accordance with a difference value generated from the sensed values.

The detection target may include at least one pattern portion formed of one of a metal and a magnetic material, and at least one non-pattern portion in a region where the at least one pattern portion is not formed.

A size of the at least one pattern portion and the at least one non-pattern portion may be size.

The at least one pattern portion and the at least one non-pattern portion may be alternately disposed in a rotation direction of the rotating body.

The two sensors may each have a size corresponding to half of the at least one pattern portion.

A size of the two sensors may correspond to a size of the at least one pattern portion.

The sensor module may include two sensing coils, and the two sensing coils are provided to different sensors of the two sensors.

The rotation information calculator may include capacitors connected to different sensing coils among the two sensing coils and forming two oscillation circuits.

The rotation information calculator may be configured to differentiate two oscillation signals output from the two oscillation circuits and to calculate the difference value.

According to another aspect there is disclosed an apparatus for sensing a rotating body, including a detection target arranged on a surface perpendicular to an extension direction of a rotating shaft of the rotating body, a sensor module facing the detection target, and comprising two sensors disposed in a rotation direction of the rotating body, and a rotation information calculator configured to calculate rotation information of the rotating body based on sensed values from the two sensors, wherein the detection target includes at least one pattern portion formed of one of a metal and a magnetic material, and at least one non-pattern portion in a region where the at least one pattern portion is not formed.

The numbers of the at least one pattern portion and the at least one non-pattern portion may be determined in accordance with sizes of the at least one pattern portion and the at least one non-pattern portion.

A size of the at least one pattern portion and the at least one non-pattern portion may be same.

A size of the at least one pattern portion and the at least one non-pattern portion may correspond to a rotation angle of 360°.

The two sensors may each have a size corresponding to half of the at least one pattern portion, and an overall size of the two sensors may correspond to a size of the at least one pattern portion.

The two sensors may each include a sensing coil arranged on a substrate facing the detection target.

The sensing coil may include a circuit pattern formed on the substrate.

The sensing coil may include a circuit pattern formed on the substrate.

Other features and aspects will be apparent from the following detailed description, the drawings, and the claims.

BRIEF DESCRIPTION OF DRAWINGS

FIGS. 3A and 3B are diagrams illustrating examples of a detection target.

FIGS. 4A and 4B are diagrams illustrating examples of a sensor module.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
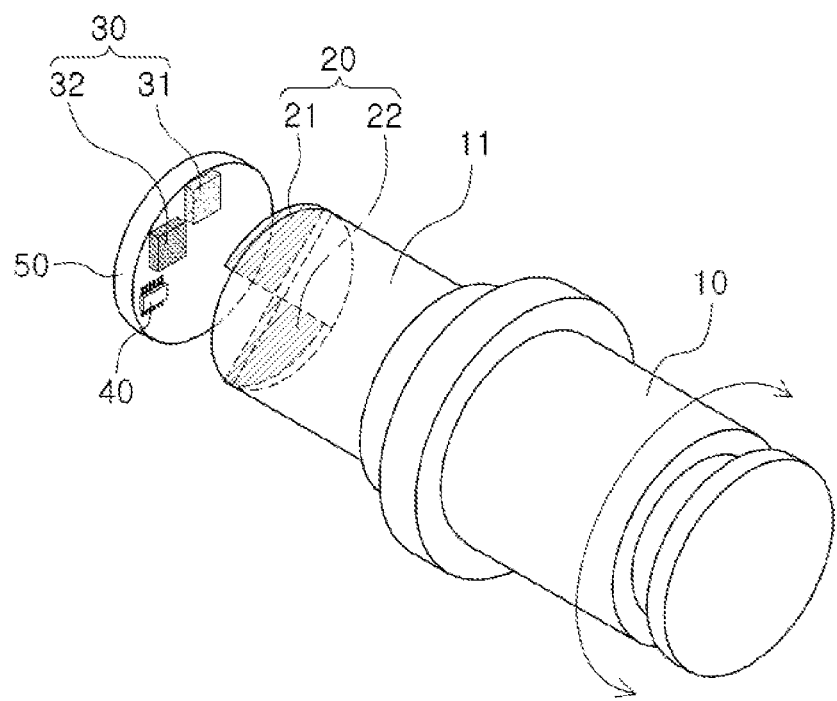
FIG. 1 is a diagram illustrating a perspective view an example of an apparatus for sensing a rotating body.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. When an element is referred to as being "directly on," "directly connected to," or "directly coupled to" another element, there may be no elements or layers intervening therebetween. Like numerals refer to like elements throughout.

The terminology used herein is for describing various examples only, and is not to be used to limit the disclosure. As used herein, the term "and/or" includes any and all combinations of one or more of the associated listed items.

The use of the term "may" with respect to an example or embodiment, e.g., as to what an example or embodiment may include or implement, means that at least one example or embodiment exists in which such a feature is included or implemented while all examples and embodiments are not limited thereto.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Also, it will be understood that when a portion "includes" an element, it can further include another element, not excluding another element, unless otherwise indicated.

Due to manufacturing techniques and/or tolerances, variations of the shapes shown in the drawings may occur. Thus, the examples described herein are not limited to the specific shapes shown in the drawings, but include changes in shape that occur during manufacturing.

Figure 2:
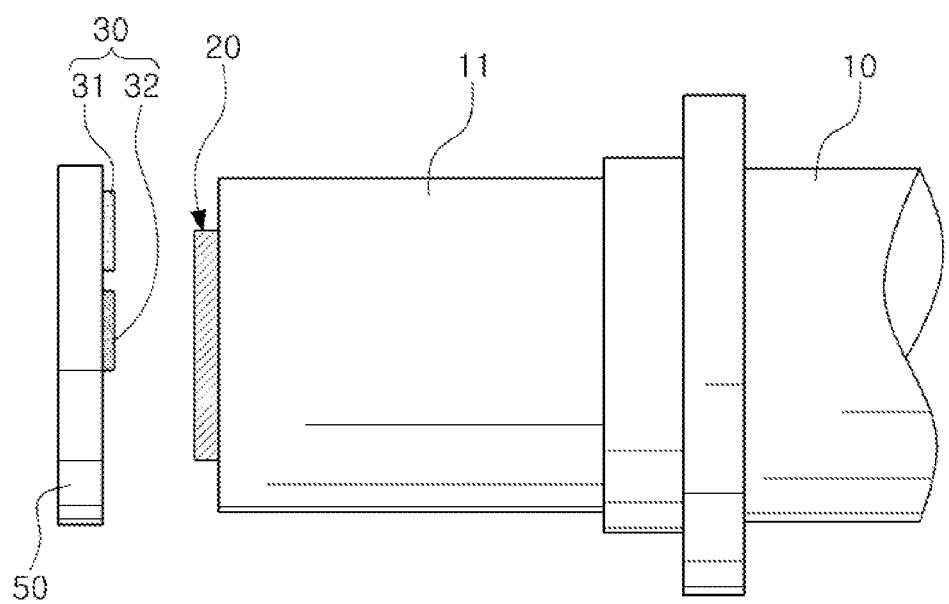
FIG. 2 is a diagram illustrating a side view of the example of an apparatus for sensing a rotating body of FIG. 1.

FIG. 1 is a diagram illustrating a perspective view of an example of an apparatus for sensing a rotating body. FIG. 2 is a diagram illustrating a side view of the example of an apparatus for sensing a rotating body of FIG. 1.

An apparatus for sensing a rotating body may include a detection target 20, a sensor module 30, and a rotation information calculator 40, and may further include a substrate 50 on which the sensor module 30 and the rotation information calculator 40 are mounted.

The detection target 20 may be connected to a wheel 10 by a rotating shaft 11. The wheel 10 may be a rotating body employed in an electronic device that is rotated either in a clockwise direction or a counter-clockwise direction by a user. The detection target 20 may rotate in a clockwise direction or a counter-clockwise direction along with the wheel 10.

The detection target 20 may include at least one pattern portion. Referring to FIG. 1, the detection target 20 may include a first pattern portion 21 and a second pattern portion 22. FIG. 1 illustrates an example in which the detection target 20 includes the first pattern portion 21 and the second pattern portion 22, but the number and type of pattern portion may be varied without departing from the spirit and scope of the illustrative examples described. For example, the detection target 20 may include a single pattern portion or three or more pattern portions. In the description below, an example in which the detection target 20 includes two pattern portions will be described for ease of description.

The first pattern portion 21 and the second pattern portion 22 may have the same shape. The first pattern portion 21 and the second pattern portion 22 may be disposed on one surface perpendicular to an extension direction of the rotating shaft 11. As an example, one surface perpendicular to an extension direction of the rotating shaft 11 may be one cross-sectional surface of the rotating shaft 11. In the description below, the example in which the first pattern portion 21 and the second pattern portion 22 are disposed on one cross-sectional surface of the rotating shaft 11 will be described. The first pattern portion 21 and the second pattern portion 22 may rotate in the same direction and at the same velocity by the rotating shaft.

The first pattern portion 21 and the second pattern portion 22 may be formed by processing a circular-plate shaped metal and magnetic material and attaching the metal and the magnetic material to the rotating shaft 11. Accordingly, the first pattern portion 21 and the second pattern portion 22 may be formed of one of materials between a metal and a magnetic material.

The first pattern portion 21 and the second pattern portion 22 each may have a size corresponding to a reference angle. An extended length of the first pattern portion 21, extended in a rotation direction of the first pattern portion 21, may be defined as a size of the first pattern portion 21, and an extended length of the second pattern portion 22, extended in a rotation direction of the second pattern portion 22, may be defined as a size of the second pattern portion 22.

The first pattern portion 21 and the second pattern portion 22 may be spaced apart from each other by a reference angle in a rotation direction. A region in which the first pattern portion 21 and the second pattern portion 22 are not arranged, for example, may be referred to as a non-pattern portion. Thus, the detection target 20 may include at least one pattern portion, and at least one non-pattern portion. In an example, the pattern portion and the non-pattern portion may be alternately disposed in a rotation direction of the rotating body. In an example, the pattern portion and the non-pattern portion may have the same size, and the numbers of the pattern portions and the non-pattern portions may be the same. An overall size of the at least one pattern portion and the at least one non-pattern portion may correspond to a rotation angle of 360°.

In an example, the first pattern portion 21 and the second pattern portion 22 each may have a shape such as, for example, an arc shape, a triangular shape, and a quadrangular shape. In an example, when the rotating shaft 11 has a cylindrical shape, the first pattern portion 21 and the second pattern portion 22 each may have an arc shape. In another example, when the rotating shaft 11 has a square columnar shape, the first pattern portion 21 and the second pattern portion 22 each may have a triangular shape or a quadrangular shape.

In an example, the first pattern portion 21 and the second pattern portion 22 may have an arc shape, a triangular shape, or a quadrangular shape in which a central region is cut. Shapes of the first pattern portion 21 and the second pattern portion 22 may be varied without departing from the spirit and scope of the illustrative examples described.

In the description below, an example in which the rotating shaft 11 has a cylindrical shape such that the first pattern portion 21 and the second pattern portion 22 arranged on one cross-sectional surface of the rotating shaft 11 may have an arc shape will be described.

The sensor module 30 may include a plurality of sensors. As an example, the sensor module 30 may include a first sensor 31 and a second sensor 32 opposing the detection target 20. The first sensor 31 and a second sensor 32 may oppose the detection target 20 and may be disposed in a rotation direction of the rotating shaft 11. By rotation of the first pattern portion 21 and the second pattern portion 22, areas of the first sensor 31 and the second sensor 32 overlapping the first pattern portion 21 and the second pattern portion 22 may change.

In an example, a size of each of the first sensor 31 and the second sensor 32 may correspond to half of a single pattern portion, and an overall size of the first sensor 31 and the second sensor 32 may correspond to a size of a single pattern portion.

Thus, by rotation of the rotating shaft 11, both of the first sensor 31 and the second sensor 32 may overlap one of the first pattern portion 21 and the second pattern portion 22, both of the first sensor 31 and the second sensor 32 may not overlap the first pattern portion 21 and the second pattern portion 22, or one of the first sensor 31 and the second sensor 32 may overlap one of the first pattern portion 21 and the second pattern portion 22, and the other of the first sensor 31 and the second sensor 32 may not overlap one of the first pattern portion 21 and the second pattern portion 22.

The first sensor 31 and the second sensor 32 each may include a sensing coil. In an example, the sensing coil may be arranged by forming a circuit pattern on a substrate. In an example, the sensing coil may be provided as a coiled-type inductor coil or a solenoid coil. The first sensor 31 and the second sensor 32 provided as sensing coils may sense rotation of the rotating body in accordance with inductance changing based upon an area of overlap between the first sensor 31 and the second sensor 32 and the first pattern portion 21 and the second pattern portion 22.

The rotation information calculator 40 may be provided as an integrated circuit and may be mounted on the substrate 50. The rotation information calculator 40 may be electrically connected to the first sensor 31 and the second sensor 32. The rotation information calculator 40 may calculate rotation information including at least one of a rotation direction, a rotation angle, and an angular velocity of a rotating body in accordance with changes in inductance of the first sensor 31 and the second sensor 32.

FIGS. 3A and 3B are diagrams illustrating examples of a detection target. FIG. 3A illustrates an example in which the detection target includes two pattern portions, and FIG. 3B illustrates an example in which the detection target includes a single pattern portion.

FIG. 3A illustrates an example in which a first pattern portion 21 and a second pattern portion 22 each may have a size corresponding to 90°. A space between the first pattern portion 21 and the second pattern portion 22 may correspond to 90°.

FIG. 3B illustrates an example in which the first pattern portion 21 has a size corresponding to 180°. In this case, a detection target 20 may include the first pattern portion 21 having a size of 180°, and thus, both ends of the first pattern portion 21 may be spaced apart from each other by a size of 180° in which a pattern portion is not arranged.

The size and the number of the at least one pattern portion of the detection target 20 may be varied without departing from the spirit and scope of the illustrative examples described. As an example, the detection target 20 may include three pattern portions each having a size of 60°, and the three pattern portions may be spaced apart from one another by 60°. The detection target 20 may also include four or more pattern portions, and the sizes of the pattern portions may be determined in accordance with an angle corresponding to the number of the pattern portions, four or more.

FIGS. 4A and 4B are diagrams illustrating examples of a sensor module. FIG. 4A illustrates an example of a sensor module for the detection target of FIG. 3A including two pattern portions, and FIG. 4B illustrates an example of a sensor module for the detection target of FIG. 3B including a single pattern portion.

Referring to FIG. 4A, each size of a first sensor 31 and a second sensor 32 may correspond to 45°, and an overall size of the first sensor 31 and the second sensor 32 may correspond to 90°. Referring to FIG. 4B, each size of a first sensor 31 and a second sensor 32 may correspond to 90°, and an overall size of the first sensor 31 and the second sensor 32 may correspond to 180°.

Figure 5:
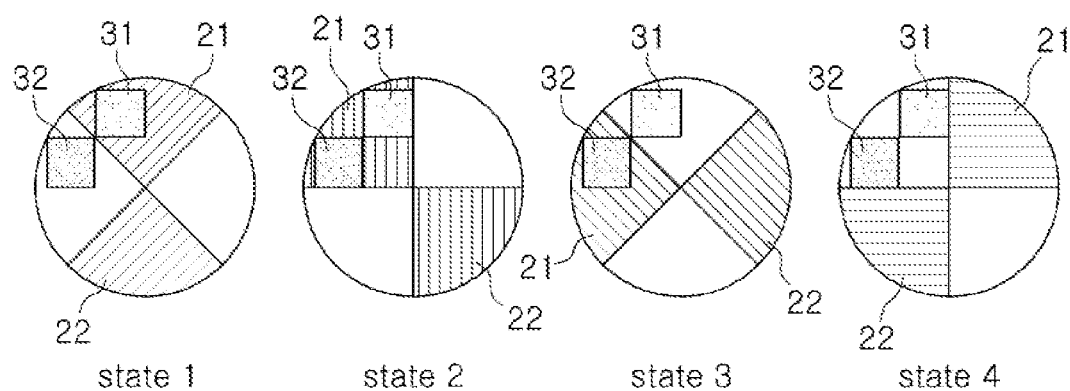
FIG. 5 is a diagram illustrating examples of a positional relationship between the detection target of FIG. 3A and the sensor module of FIG. 4A in accordance with rotation of the detection target of FIG. 3A.
Figure 6:
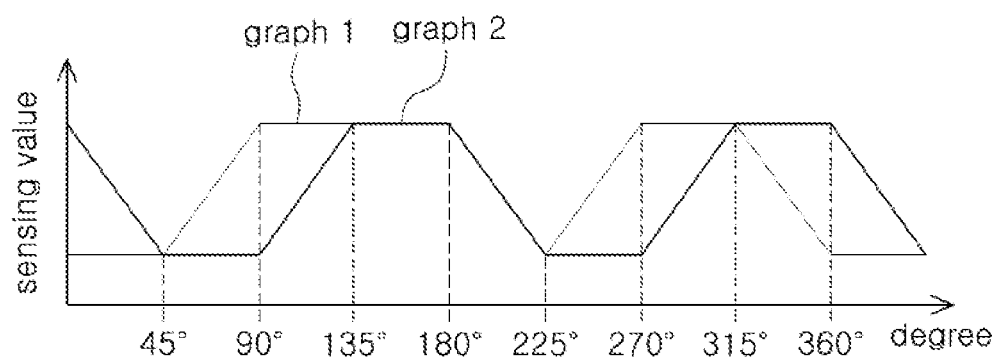
FIG. 6 is a graph illustrating an example of sensed value values measured in the sensor module of FIG. 4A in accordance with rotation of the detection target of FIG. 3A.

FIG. 5 is a diagram illustrating an example of a positional relationship between the detection target of FIG. 3A and the sensor module of FIG. 4A. FIG. 6 is a graph illustrating an example of sensed values measured in the sensor module of FIG. 4A in accordance with rotation of the detection target of FIG. 3A.

Referring to FIG. 5, an area of overlap between a detection target 20 and a sensor module 30 may change by rotation of a wheel 10 or a rotating shaft 11. For example, an area of overlap between a first pattern portion 21 and a second pattern portion 22, and a first sensor 31, and an area of overlap between the first pattern portion 21 and the second pattern portion 22, and a second sensor 32 may be changed. In FIG. 5, it is assumed that the first pattern portion 21 and the second pattern portion 22 may rotate in a counter-clockwise direction.

In a first state (State 1), the first sensor 31 may overlap the first pattern portion 21, and the second sensor 32 may not overlap the first pattern portion 21 and the second pattern portion 22. When a pattern formed of a metal material becomes adjacent to the first sensor 31 formed of a sensing coil, current may be applied to the pattern by a flux generated from the sensing coil, and a flux may be generated in the pattern due to the current applied to the pattern. The flux generated in the pattern may offset a flux of the sensing coil of the first sensor 31 such that inductance of the sensing coil of the first sensor 31 may decrease. Thus, referring to 0° in FIG. 6 which corresponds to the first state (state 1), the inductance of the first sensor 31 (graph 1) may be maintained at a low level, whereas inductance of the second sensor 32 (graph 2) may be maintained at a high level.

After the first state (state 1), the first pattern portion 21 and the second pattern portion 22 may rotate in a counter-clockwise direction by 45°, and the first sensor 31 and the second sensor 32 may overlap the first pattern portion 21 in a second state (state 2). Thus, referring to 45° in FIG. 6 which correspond to the second state (state 2), the inductance of the first sensor 31 (graph 1) may be maintained at a low level, and the inductance of the second sensor 32 (graph 2) may be changed to a low level.

After the second state (state 2), the first pattern portion 21 and the second pattern portion 22 may rotate in a counter-clockwise direction by 45°, and the first sensor 31 may not overlap the first pattern portion 21 and the second pattern portion 22, and the second sensor 32 may overlap the first pattern portion 21, in a third state (state 3). Thus, referring to 90° in FIG. 6 which correspond to the third state (state 3), the inductance of the first sensor 31 (graph 1) may be changed to a high level, and the inductance of the second sensor 32 (graph 2) may be maintained at a low level.

After the third state (state 3), the first pattern portion 21 and the second pattern portion 22 may rotate in a counter-clockwise direction by 45°, and the first sensor 31 and the second sensor 32 may not overlap the first pattern portion 21 and the second pattern portion 22 in a fourth state (state 4). Thus, referring to 135° in FIG. 6 which corresponds to the fourth state (state 4), the inductance of the first sensor 31 (graph 1) may be maintained at a high level, and the inductance of the second sensor 32 (graph 2) may be changed to a high level.

Figure 7:
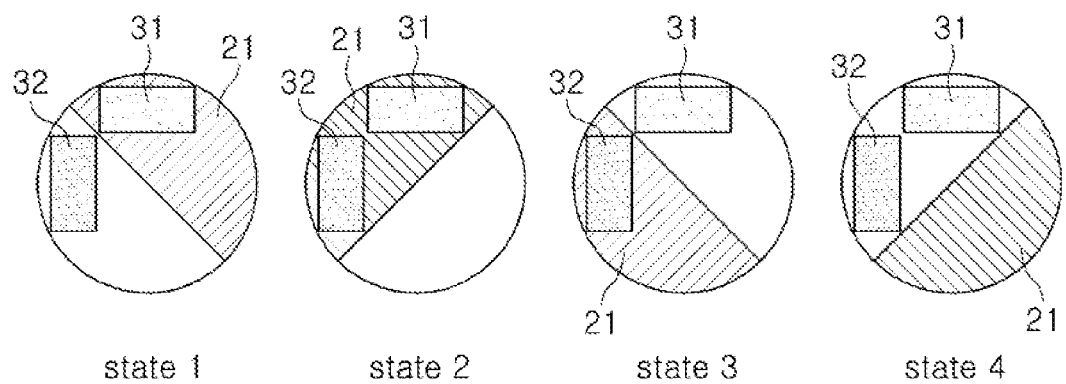
FIG. 7 is a diagram illustrating examples of a positional relationship between the detection target of FIG. 3B and the sensor module of FIG. 4B.

FIG. 7 is a diagram illustrating an example of a positional relationship between the detection target of FIG. 3B and the sensor module of FIG. 4B in accordance with rotation of the detection target of FIG. 3B.

Referring to FIG. 7, an area of overlap between a detection target 20 and a sensor module 30 may change by rotation of a wheel 10 or a rotating shaft 11. For example, an area of overlap between a first pattern portion 21, and a first sensor 31 and a second sensor 32 may be changed. In FIG. 7, it is assumed that the first pattern portion 21 may rotate in a counter-clockwise direction.

In a first state (state 1), the first sensor 31 may overlap the first pattern portion 21, and the second sensor 32 may not overlap the first pattern portion 21. When a pattern formed of a metal material comes adjacent to the first sensor 31 formed of a sensing coil, current may be applied to the pattern by a flux generated from the sensing coil, and a flux may be generated in the pattern due to the current applied to the pattern. The flux generated in the pattern may offset a flux of the sensing coil of the first sensor 31 such that inductance of the sensing coil of the first sensor 31 may decrease. Thus, in the first state (state 1), the inductance of the first sensor 31 may be maintained at a low level, whereas inductance of the second sensor 32 may be maintained at a high level.

After the first state (state 1), the first pattern portion 21 may rotate in a counter-clockwise direction by 90°, and the first sensor 31 and the second sensor 32 may overlap the first pattern portion 21 in a second state (state 2). Thus, in the second state (state 2), the inductance of the first sensor 31 may be maintained at a low level, and the inductance of the second sensor 32 may be changed to a low level.

After second state (state 2), the first pattern portion 21 may rotate in a counter-clockwise direction by 90°, and the first sensor 31 may not overlap the first pattern portion 21, and the second sensor 32 may overlap the first pattern portion 21 in a third state (state 3). Thus, in the third state (state 3), the inductance of the first sensor 31 may be changed to a high level, and the inductance of the second sensor 32 may be maintained at a low level.

After the third state (state 3), the first pattern portion 21 may rotate in a counter-clockwise direction by 90°, and the first sensor 31 and the second sensor 32 may not overlap the first pattern portion 21 in a fourth state (state 4). Thus, in the fourth state (state 4), the inductance of the first sensor 31 may be maintained at a high level, and the inductance of the second sensor 32 may be changed to a high level.

The rotation information calculator 40 may calculate rotation information including at least one of a rotation direction, a rotation angle, and an angular velocity of a rotating body in accordance with changes in inductance of the first sensor 31 and the second sensor 32.

Figure 8:
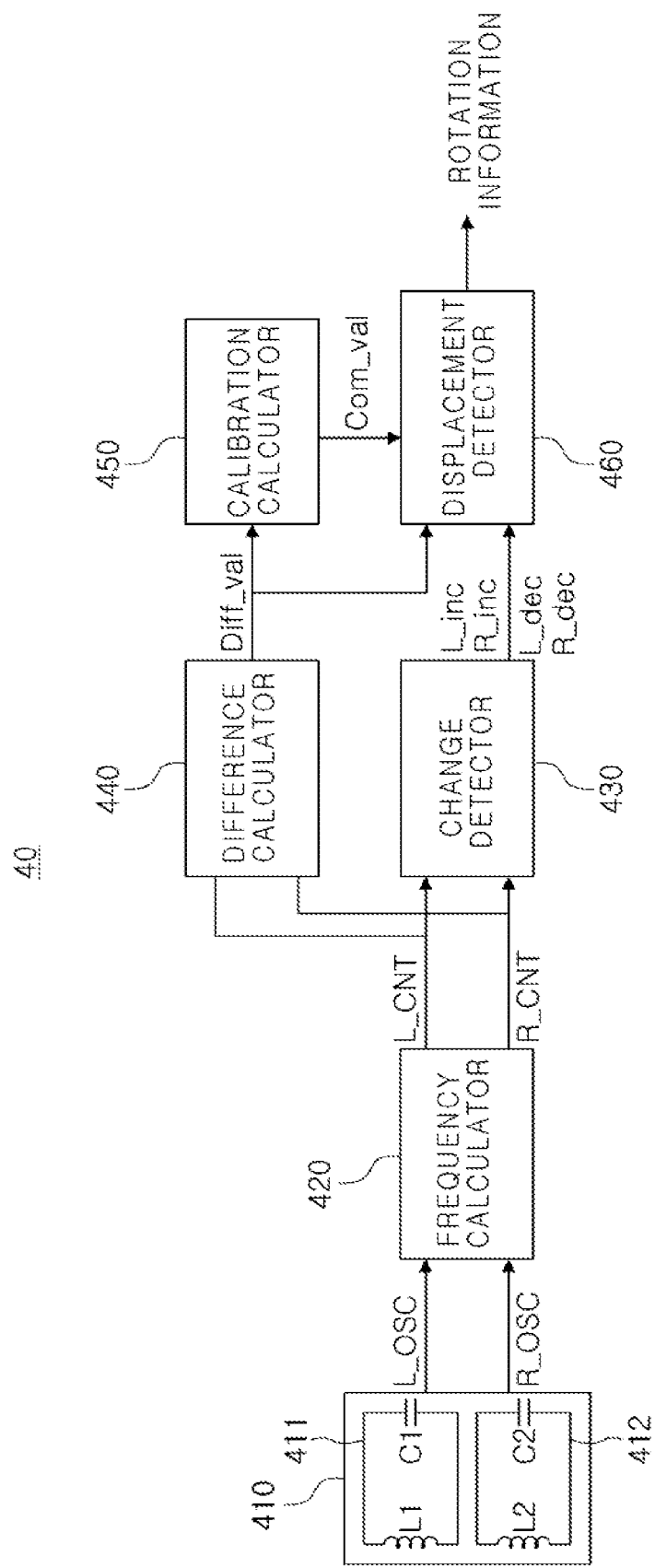
FIG. 8 is a diagram illustrating an example of a rotation information calculator.
Figure 9:
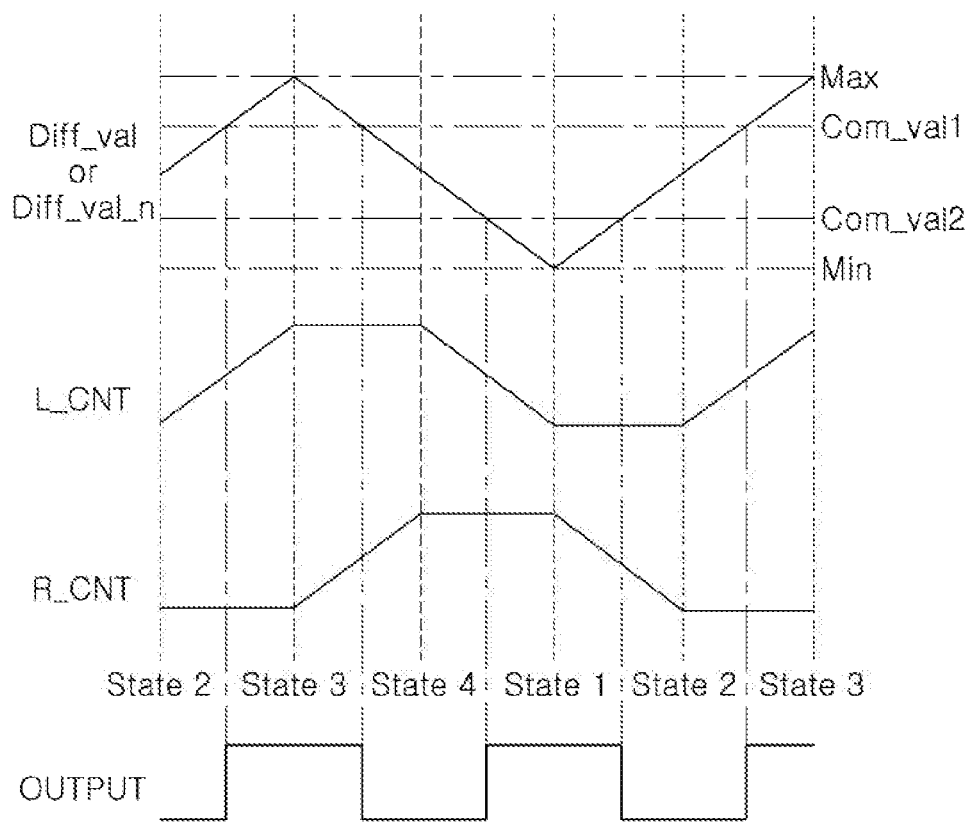
FIG. 9 is a diagram illustrating an example of waveforms of main signals of the rotation information calculator of FIG. 8.

FIG. 8 is a diagram illustrating an example of a rotation information calculator. FIG. 9 is a diagram illustrating an example of waveforms of main signals of the rotation information calculator of FIG. 8.

A method of sensing a rotating body of an apparatus for sensing a rotating body will be described in greater detail with reference to FIG. 8.

A rotation information calculator 40 may include an oscillator 410, a frequency calculator 420, a change detector 430, a difference calculator 440, a calibration calculator 450, and a displacement detector 460.

The oscillator 410 may include at least two oscillation circuits 411 and 412. In an example, the at least two oscillation circuits may include a first oscillation circuit 411 and the a second oscillation circuit 412. The first oscillation circuit 411 may include a first capacitor C1 connected to a first sensing coil L1, and the second oscillation circuit 412 may include a second capacitor C2 connected to a second sensing coil L2. In FIG. 8, the first sensing coil L1 and the second sensing coil L2 may be the sensing coils of the first sensor 31 and the second sensor 32 in the examples illustrated in FIGS. 1 to 4B. A pair of the sensing coils and a pair of the capacitors may be included in an LC oscillator. In example embodiments, the oscillators may include various forms of general oscillators.

The first oscillation circuit 411 and the second oscillation circuit 412 may output a first oscillation signal L_OSC and a second oscillation signal R_OSC, respectively. When an area of overlap between the detection target 20, and the first sensing coil and the second sensing coil is changed in accordance with rotation, frequencies of the first oscillation signal L_OSC and the second oscillation signal R_OSC output from the first oscillation circuit 411 and the second oscillation circuit 412 may change.

The frequency calculator 420 may generate a first count value L_CNT and a second count value R_CNT in accordance with changes in frequencies of the first oscillation signal L_OSC and the second oscillation signal R_OSC provided from the first oscillation circuit 411 and the second oscillation circuit 412. As an example, the frequency calculator 420 may count frequencies of the first oscillation signal L_OSC and the second oscillation signal R_OSC, and may generate the first count value L_CNT and the second count value R_CNT.

The change detector 430 may detect changes of the first count value L_CNT and the second count value R_CNT. As an example, the change detector 430 may detect changes of the first count value L_CNT and the second count value R_CNT with a reference time interval $\Delta t$, and may generate a first count increase value L_inc, a first count decrease value L_dec, a second count increase value R_inc, and a second count decrease value R_dec. As an example, when the first count value L_CNT increases, the change detector 430 may determine the first count increase value L_inc as 1, and when the first count value L_CNT decreases, the change detector 430 may determine the first count decrease value L_dec as 1. When the second count value R_CNT increases, the change detector 430 may determine the second count increase value R_inc as 1, and when the second count value R_CNT decreases, the change detector 430 may determine the second count decrease value R_dec as 1. Otherwise, the change detector 430 may determine the first count increase value L_inc, the first count decrease value L_dec, the second count increase value R_inc, and the second count decrease value R_dec as 0.

A difference calculator 440 may calculate a difference between the first count value L_CNT and the second count value R_CNT and may calculate a difference value Diff_val. The difference calculator 440 may normalize the difference value Diff_val in accordance with a maximum value Max and a minimum value Min of the difference value Diff_val, and may calculate a normalized difference value Diff_val_n. As an example, when a maximum value Max and a minimum value Min of the difference value Diff_val are normalized to 10 bits, a normalized difference value Diff_val_n may be determined according to Equation 1 below.

$$\text{Diff\_val\_}n = (\text{Diff\_val} - \text{Min}) * 1023 / (\text{Max} - \text{Min})$$

In the description below, operations of an apparatus for sensing a rotating body will be described in greater detail with reference to a difference value Diff_val for ease of description. The descriptions presented below may also be applied to the normalized difference value Diff_val_n.

The calibration calculator 450 may calculate a plurality of comparison values Com_val in accordance with a target sensing angle and a size of a pattern portion, and may provide the comparison values Com_val to the displacement detector 460.

The comparison values Com_val may be positioned within a range of a maximum value Max and a minimum value Min of the difference value Diff_val. Each difference between adjacent comparison values of the comparison values may be the same. In an example a difference between a maximum comparison value of the comparison values and a maximum value Max of the difference value Diff_val may be twice a difference between adjacent comparison values of the comparison values. In an example, a difference between a minimum comparison value of the comparison values and a minimum value Min of the difference value Diff_val may be twice a difference between adjacent comparison values of the comparison values.

The comparison values may be determined in accordance with a target sensing angle and a size of a pattern portion. The number of the comparison values may be determined in accordance with a ratio between an angle corresponding to a size of a pattern portion and a target sensing angle, and levels of the comparison values may be determined by dividing an angle corresponding to a size of a pattern portion by a target sensing angle.

FIG. 9 illustrates two comparison values (com_val1, com_val2), but the two comparison values are examples. The number of the comparison values may be determined in accordance with a target sensing angle and a size of a pattern.

As an example, when a size of the sensing coil corresponds to 90°, a size of a pattern corresponds to 180°, and a target sensing angle is 7.5°, 24 (=90/7.5*2) comparison values may be calculated. By the 24 comparison values, 180° corresponding to a size of a pattern may be divided to 7.5°, a target sensing angle, in a uniform manner.

Also, when a size of the sensing coil corresponds to 45°, a size of a pattern corresponds to 90°, and a target sensing angle is 7.5°, 12 (=45/7.5*2) comparison values may be calculated. By the 12 comparison values, 90° corresponding to a size of a pattern may be divided by 7.5°, a target sensing angle, in a uniform manner.

Also, when a size of the sensing coil corresponds to 22.5°, a size of a pattern corresponds to 45°, and a target sensing angle is 7.5°, 6 (=22.5/7.5*2) comparison values may be calculated. By the 6 comparison values, 45° corresponding to a size of a pattern may be divided to 7.5°, a target sensing angle, in a uniform manner.

Also, when a size of the sensing coil corresponds to 7.5°, a size of a pattern corresponds to 15°, and a target sensing angle is 7.5°, 2 (=7.5/7.5*2) comparison values may be calculated. By the 2 comparison values, 15° corresponding to a size of a pattern may be divided to 7.5°, a target sensing angle, in a uniform manner.

The displacement detector 460 may calculate a rotation direction of a rotating body in accordance with positional relationships between the first count increase value L_inc, the first count decrease value L_dec, the second count increase value R_inc, and the second count decrease value R_dec, detected at a comparison point in time when the difference value Diff_val and the comparison values are compared, and at least two sensing coils.

As an example, signals of the first count increase value L_inc, the second count increase value R_inc, the first count decrease value L_dec, and the second count decrease value R_dec are 1000 at one point in time, and are 0100 at a next point in time, a rotation direction may be calculated in accordance with the first count increase value L_inc and the second count increase value R_inc.

The displacement detector 460 may compare the difference value Diff_val with the comparison values Com_val provided from the calibration calculator 450, and may calculate an output value OUTPUT. The displacement detector 460 may convert a state of the output value OUTPUT at a point in time in which a level of the difference value Diff_val is equal to each level of the first comparison value and the second comparison value, and may calculate the output value OUTPUT.

For example, when it is assumed that two comparison values, the first comparison value and the second comparison value, may be provided from the calibration calculator 450, and the output value OUTPUT is at a low level before comparison with the first comparison value, the displacement detector 460 may determine a difference value Diff_val equal to or greater than the first comparison value as a high level, may determine a difference value Diff_val less than the second comparison value as a high level, and may determine a difference value Diff_val less than the first comparison value and equal to or greater than the second comparison value as a low level, thereby calculating the output value OUTPUT.

The displacement detector 460 may calculate a rotation angle of the detection target from each of gaps between the high level section and the low level section of the output value OUTPUT. As an example, the displacement detector 460 may calculate a rotation angle from gaps between the high level section and the low level section of the output value OUTPUT.

As described above, a fine displacement of the rotating body may be accurately sensed from changes in frequency of an oscillation signal.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for sensing a rotating body, the apparatus comprising:
a detection target arranged on a surface perpendicular to an extension direction of a rotating shaft of the rotating body and comprising at least one pattern portion formed of a metal or a magnetic material;
a sensor module facing the detection target and comprising two sensors disposed in a rotation direction of the rotating body; and
a rotation information calculator configured to calculate rotation information of the rotating body based on sensed values from the two sensors and to calculate a rotation angle of the rotating body based on a difference between the sensed values,
wherein a first sensor of the two sensors comprises a first sensing coil,
wherein a second sensor of the two sensors comprises a second sensing coil, and
wherein a size of each sensor of the two sensors in the rotation direction of the rotating body is equal to one half of a size of each pattern of the at least one pattern portion in the rotation direction of the rotating body.

2. The apparatus for sensing a rotating body of claim 1, wherein the detection target comprises:
at least one non-pattern portion in a region where the at least one pattern portion is not formed.

3. The apparatus for sensing a rotating body of claim 2, wherein a size of each pattern portion of the at least one pattern portion is equal to a size of each non-pattern portion of the at least one non-pattern portion.

4. The apparatus for sensing a rotating body of claim 2, wherein the at least one pattern portion and the at least one non-pattern portion are alternately disposed in the rotation direction of the rotating body.

5. The apparatus for sensing a rotating body of claim 2, wherein each pattern of the at least one pattern is large enough to simultaneously oppose an entire surface of a first sensor of the two sensors and an entire surface of a second sensor of the two sensors.

6. The apparatus for sensing a rotating body of claim 1, wherein a total size of the two sensors in the rotation direction of the rotating body is equal to the size of each pattern of the at least one pattern portion in the rotation direction of the rotating body.

7. The apparatus for sensing a rotating body of claim 1, wherein the rotation information calculator comprises:
a first capacitor connected to the first sensing coil to form a first oscillation circuit; and
a second capacitor connected to the second sensing coil to form a second oscillation circuit.

8. The apparatus for sensing a rotating body of claim 7, wherein the first oscillation circuit is configured to generate a first oscillation signal,
the second oscillation circuit is configured to generate a second oscillation signal, and
the rotation information calculator is further configured to calculate a difference between a frequency of the first oscillation signal and a frequency of the second oscillation signal as the difference value.

9. The apparatus for sensing a rotating body of claim 1, wherein the two sensors are spaced apart from each other in the rotation direction of the rotating body.

10. An apparatus for sensing a rotating body, the apparatus comprising:
a detection target arranged on a surface perpendicular to an extension direction of a rotating shaft of the rotating body;
a sensor module facing the detection target and comprising two sensors disposed in a rotation direction of the rotating body; and
a rotation information calculator configured to calculate rotation information of the rotating body based on a difference between sensed values from the two sensors and to calculate a rotation angle of the rotating body based on a difference between the sensed values, wherein the detection target comprises:
at least one pattern portion formed of a metal or a magnetic material; and
at least one non-pattern portion in a region where the at least one pattern portion is not formed, wherein the two sensors are spaced apart from each other in the rotation direction of the rotating body by a rotation angle greater than 0° and less than 180°, wherein a first sensor of the two sensors comprises a first sensing coil disposed on a substrate facing the detection target, wherein a second sensor of the two sensors comprises a second coil disposed on the substrate facing the detection target, and wherein a size of each sensor of the two sensors in the rotation direction of the rotating body is equal to one half of a size of each pattern of the at least one pattern portion in the rotation direction of the rotating body.

11. The apparatus for sensing a rotating body of claim 9, wherein a number of the at least one pattern portion and a number of the at least one non-pattern portion are determined in accordance with a size of each pattern of the at least one pattern portion and a size of each non-pattern portion of the at least one non-pattern portion.

12. The apparatus for sensing a rotating body of claim 11, wherein the size of each pattern of the at least one pattern portion is equal to the size of each non-pattern portion of the at least one non-pattern portion.

13. The apparatus for sensing a rotating body of claim 12, wherein
a total size of the two sensors in the rotation direction of the rotating body is equal to the size of each pattern of the at least one pattern portion in the rotation direction of the rotating body.

14. The apparatus for sensing a rotating body of claim 9, wherein a total size in the rotation direction of the rotating body of the at least one pattern portion and the at least one non-pattern portion corresponds to a rotation angle of 360°.

15. The apparatus for sensing a rotating body of claim 9, wherein the first sensing coil comprises a first circuit pattern formed on the substrate, and
the second sensing coil comprises a second circuit pattern formed on the substrate.

16. The apparatus for sensing a rotating body of claim 9, wherein respective centers of the two sensors are spaced apart from each other in the rotation direction of the rotating body by a rotation angle greater than 0° and less than or equal to 90°.

17. An apparatus for sensing a rotating body, the apparatus comprising:
a detection target arranged on a surface perpendicular to an extension direction of a rotating shaft of the rotating body;
a sensor module facing the detection target and comprising two sensors disposed in a rotation direction of the rotating body; and
a rotation information calculator configured to calculate rotation information of the rotating body based on sensed values from the two sensors,
wherein the detection target comprises:
at least one pattern portion formed of a metal or a magnetic material; and
at least one non-pattern portion in a region where the at least one pattern portion is not formed,
wherein the two sensors are spaced apart from each other in the rotation direction of the rotating body by a rotation angle greater than 0° and less than 180°, and
wherein each pattern of the at least one pattern is large enough to simultaneously oppose an entire surface of a first sensor of the two sensors and an entire surface of a second sensor of the two sensors.

\* \* \* \* \*